(12) United States Patent
Nakayama

(10) Patent No.: US 11,009,117 B2
(45) Date of Patent: May 18, 2021

(54) GEARBOX, WEIGHT REDUCTION METHOD THEREFOR, AND ROBOT

(71) Applicant: Fanuc Corporation, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 796 days.

(21) Appl. No.: 15/823,846

(22) Filed: Nov. 28, 2017

(65) Prior Publication Data

US 2018/0195600 A1  Jul. 12, 2018

(30) Foreign Application Priority Data

Jan. 6, 2017  (JP) .............................. JP2017-001340

(51) Int. Cl.
*F16H 57/04* (2010.01)
*H02K 7/116* (2006.01)
*F16H 57/02* (2012.01)

(52) U.S. Cl.
CPC ......... *F16H 57/0463* (2013.01); *H02K 7/116* (2013.01); *F16H 57/0464* (2013.01); *F16H 2057/02091* (2013.01)

(58) Field of Classification Search
CPC ............. F16H 57/0421; F16H 57/0463; F16H 57/0464; H02K 7/116
See application file for complete search history.

(56) References Cited

U.S. PATENT DOCUMENTS

| | | | | |
|---|---|---|---|---|
| 4,420,990 A | * | 12/1983 | Hauser | F16H 57/038 184/6.12 |
| 5,018,407 A | * | 5/1991 | Hoecht | F16H 57/0421 184/109 |
| 6,938,731 B2 | * | 9/2005 | Slesinski | F16H 57/0421 184/11.1 |
| 8,627,928 B2 | * | 1/2014 | Sowul | F16H 57/0423 184/106 |

(Continued)

FOREIGN PATENT DOCUMENTS

| | | |
|---|---|---|
| CN | 202215443 U | 5/2012 |
| CN | 102632496 A | 8/2012 |

(Continued)

OTHER PUBLICATIONS

The State Intellectual Property Office of the People's Republic of China; First Office Action for Chinese Application No. 201711376145.1; dated Jul. 30, 2019; 8 pages.

(Continued)

*Primary Examiner* — William Kelleher
*Assistant Examiner* — Gregory T Prather
(74) *Attorney, Agent, or Firm* — Shackelford, Bowen, McKinley & Norton, LLP

(57) ABSTRACT

A reduction in the amount of filled grease and a reduction in weight are achieved, and an excessive rise in the internal pressure is suppressed. Provided is a gearbox including: a plurality of gears that are rotated by a motor; a housing that has a sealed interior space for rotatably accommodating the respective gears; and a spacer that is disposed in the interior space of the housing and that partially occupies the interior space, wherein the spacer has a lower density than grease and is elastically deformable so as to change the volume thereof according to the internal pressure of the interior space.

7 Claims, 6 Drawing Sheets

(56) References Cited

U.S. PATENT DOCUMENTS

| | | | |
|---|---|---|---|
| 10,451,171 B1* | 10/2019 | Langenfeld | F16H 57/0441 |
| 2002/0185336 A1* | 12/2002 | West | F16H 25/2214 |
| | | | 184/5 |
| 2004/0149519 A1* | 8/2004 | Slesinski | F16H 57/0483 |
| | | | 184/6.25 |
| 2008/0087125 A1* | 4/2008 | Funahashi | F16H 57/021 |
| | | | 74/467 |
| 2009/0022437 A1* | 1/2009 | Vierheilig | F16C 33/6648 |
| | | | 384/13 |
| 2009/0255369 A1* | 10/2009 | Solak | F16H 57/0447 |
| | | | 74/606 R |
| 2011/0048856 A1* | 3/2011 | Thivierge | F16H 57/0406 |
| | | | 184/6.11 |
| 2011/0200781 A1* | 8/2011 | Sowul | F16H 57/0423 |
| | | | 428/71 |
| 2012/0125150 A1* | 5/2012 | Dinter | F03D 15/10 |
| | | | 74/730.1 |

FOREIGN PATENT DOCUMENTS

| | | |
|---|---|---|
| DE | 102009011734 A1 | 9/2010 |
| DE | 102010011789 A1 | 4/2011 |
| DE | 102011010484 A1 | 5/2012 |
| JP | H07-063152 A | 3/1995 |
| JP | H07-310808 A | 11/1995 |
| JP | H09-014405 A | 1/1997 |
| JP | 2001-224149 A | 8/2001 |
| JP | 2003-329110 A | 11/2003 |
| JP | 2005-140297 A | 6/2005 |
| JP | 2016-094159 A | 5/2016 |

OTHER PUBLICATIONS

Japan Patent Office, Office Action dated Nov. 20, 2018 for Japan Application No. 2017-001340.

* cited by examiner

GEARBOX, WEIGHT REDUCTION METHOD THEREFOR, AND ROBOT

CROSS-REFERENCE TO RELATED APPLICATIONS

This application is based on Japanese Patent Application No. 2017-001340, the contents of which are incorporated herein by reference.

TECHNICAL FIELD

The present invention relates to a gearbox, a weight reduction method therefor, and a robot.

BACKGROUND ART

In the related art, there are known geared motors in which, in a space in a gearbox where gears etc. do not exist, a spacer for filling up the space is disposed, thus achieving a reduction in the amount of grease filling the gearbox and a reduction in weight (for example, see PTL 1).

CITATION LIST

Patent Literature

{PTL 1} Japanese Unexamined Patent Application, Publication No. 2001-224149

SUMMARY OF INVENTION

Technical Problem

An object of the present invention is to provide a gearbox, a weight reduction method therefor, and a robot that are capable of achieving a reduction in the amount of filled grease and a reduction in weight and suppressing an excessive rise in the internal pressure.

Solution to Problem

According to one aspect, the present invention provides a gearbox including: a plurality of gears that are rotated by a motor; a housing that has a sealed interior space for rotatably accommodating the respective gears; and a spacer that is disposed in the interior space of the housing and that partially occupies the interior space, wherein the spacer has a lower density than grease and is elastically deformable so as to change the volume thereof according to an internal pressure of the interior space.

In the above-described aspect, the spacer may be formed of a porous elastic material in which individual pores are closed.

In the above-described aspect, the spacer may be obtained by applying processing for occluding pores to the surface of a porous elastic material.

In the above-described aspect, the processing for occluding the pores may be coating for coating the surface.

In the above-described aspect, the spacer may be a sealed bag formed of an elastic material.

In the above-described aspect, the housing may have an accommodation space for accommodating the spacer in a compressed state, and the spacer may be kept immobile in the accommodation space due to an elastic restoring force thereof.

According to another aspect, the present invention provides a gearbox weight reduction method including disposing, in a sealed interior space of a housing for rotatably accommodating a plurality of gears rotated by a motor, a spacer that has a lower density than grease and that is elastically deformable so as to change the volume thereof according to an internal pressure of the interior space.

According to still another aspect, the present invention provides a robot including: the motor; and a gearbox according to one of claims 1 to 6, that reduces the rotation speed of the motor.

DESCRIPTION OF EMBODIMENTS

A gearbox 3 and a robot 1 according to one embodiment of the present invention will be described below with reference to the drawings.

Figure 1:
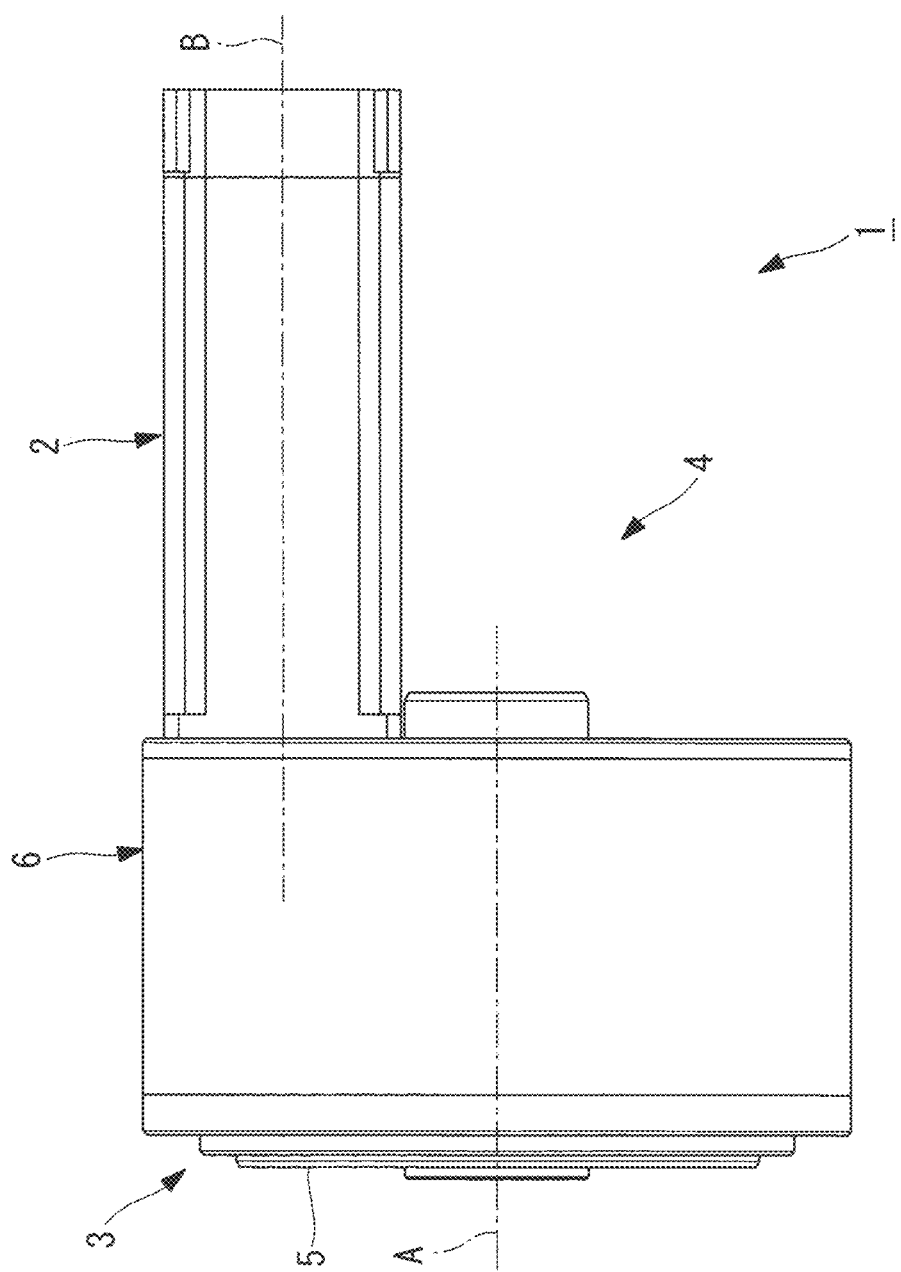
FIG. 1 is a front view showing a rotating-shaft module provided in a robot according to one embodiment of the present invention.

As shown in FIG. 1, the robot 1 of this embodiment is provided with at least one rotating-shaft module 4 that is composed of: a motor 2; and the gearbox 3 according to this embodiment, which reduces the rotation speed of the shaft of the motor 2 and which outputs the speed-reduced rotation as the rotation of an output shaft 5. In the figure, reference sign A denotes the central axis of a housing body 10, to be described later, and reference sign B denotes the central axis of the motor 2.

For example, it is possible to configure an articulated robot by fixing a housing 6, to be described later, of a gearbox 3 of a first rotating-shaft module 4 to a base material (not shown), fixing an output shaft 5, to be described later, thereof to a first link member (not shown), fixing a housing 6 of a gearbox 3 of a second rotating-shaft module 4 to a distal end of the first link member, and fixing an output shaft 5 thereof to a second link member (not shown), thus connecting a plurality of rotating-shaft modules 4.

Figure 2:
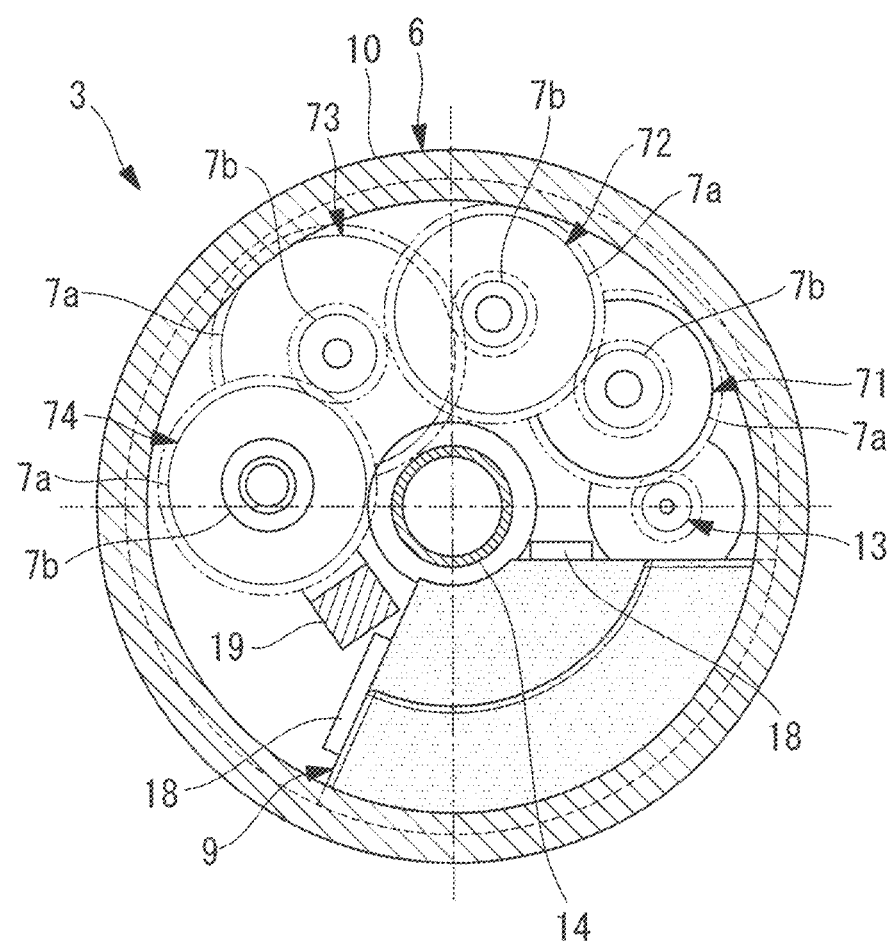
FIG. 2 is an A-A transverse sectional view of a gearbox provided in the rotating-shaft module shown in FIG. 1.
Figure 3:
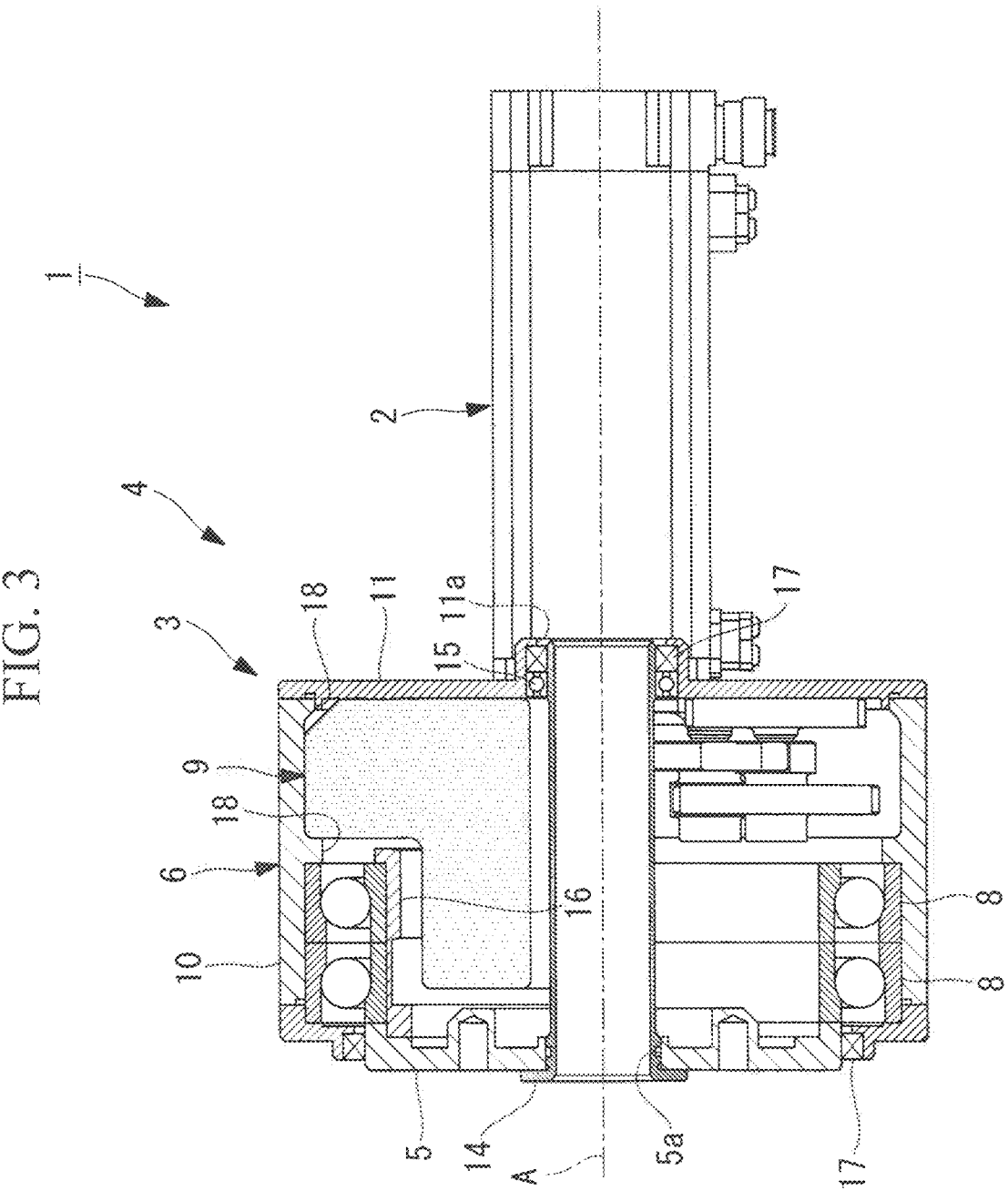
FIG. 3 is a longitudinal sectional view of the gearbox provided in the rotating-shaft module shown in FIG. 1.

As shown in FIGS. 2 and 3, the gearbox 3 of this embodiment is a reducer and is provided with: the housing 6, to which the motor 2 is fixed; the output shaft 5, which is rotatably supported by the housing 6; a plurality of gears 13, 71, 72, 73, and 74, to be described later, that are accommodated in the interior space of the housing 6 and that speed-reduce the driving force of the motor 2 to transfer the speed-reduced driving force to the output shaft 5; and a spacer 9 that is disposed in a partial section of the interior space that is not occupied by the gears 13, 71, 72, 73, and 74.

The housing 6 is provided with the cylindrical housing body 10 and a disc-shaped end plate 11 that closes off one end of the housing body 10. The other end of the housing body 10 is closed off by the disc-shaped output shaft 5. The output shaft 5 is supported by bearings 8 rotatably about the central axis A of the housing body 10. As shown in FIG. 2, the end plate 11 is provided with a through-hole 12 (see FIGS. 6 and 7) through which the pinion gear (gear) 13 attached to the shaft of the motor 2 is made to pass, so that the motor 2 can be attached thereto, with the pinion gear 13 being inserted into the interior space of the housing 6.

The output shaft 5 and the end plate 11 are provided with central holes 5a and 11a, respectively. A cylinder-shaped duct member 14 is disposed so as to be hung across the central hole 5a in the output shaft 5 and the central hole 11a in the end plate 11. The duct member 14 is fixed to the output shaft 5 and is rotatably supported in the end plate 11 by means of a bearing 15. With the duct member 14, the vicinity of the rotation center of the output shaft 5 in the gearbox 3 is formed to be hollow and can be used for wiring a wire-shaped body, such as a cable.

An annular internal cog 16 is fixed to the output shaft 5. In the figure, reference sign 17 denotes seal members for sealing the interior space while allowing relative rotation between the output shaft 5 and the housing body 10 and between the end plate 11 and the duct member 14.

One end of the housing body 10 is closed off by the end plate 11, the other end thereof is closed off by the output shaft 5, and the cylindrical duct member 14 is fitted into the central holes 5a and 11a of the output shaft 5 and the end plate 11, thereby forming a donut-shaped sealed interior space in the housing 6.

Ribs 18, to be described later, are provided on the inner surface of the housing body 10 and on the interior-space side of the end plate 11.

In the example shown in FIGS. 2 and 3, the gearbox 3 is provided with the pinion gear 13, which is attached to the shaft of the motor 2, and the four gears 71, 72, 73, and 74, which are rotatably supported in the housing 6. The gears 71, 72, 73, and 74 are each provided with a large cog 7a and a small cog 7b that are coaxially fixed. The large cog 7a of the first gear (gear) 71 is engaged with the pinion gear 13, which is attached to the shaft of the motor 2, the large cog 7a of the second gear (gear) 72 is engaged with the small cog 7b of the first gear 71, the large cog 7a of the third gear (gear) 73 is engaged with the small cog 7b of the second gear 72, the large cog 7a of the fourth gear (gear) 74 is engaged with the small cog 7b of the third gear 73, and the small cog 7b of the fourth gear 74 is engaged with the internal cog 16, which is fixed to the output shaft 5. Accordingly, the rotation speed of the shaft of the motor 2 is reduced and is transferred to the output shaft 5.

In the example shown in FIGS. 2 and 3, more than half of the interior space of the housing 6 in the circumferential direction is occupied by the five gears 13, 71, 72, 73, and 74, i.e., the pinion gear 13 to the fourth gear 74, and part of the remaining interior space is occupied by the spacer 9. In the figure, reference sign 19 denotes a support post for supporting the rotary shaft of the fourth gear 74.

Figure 4:
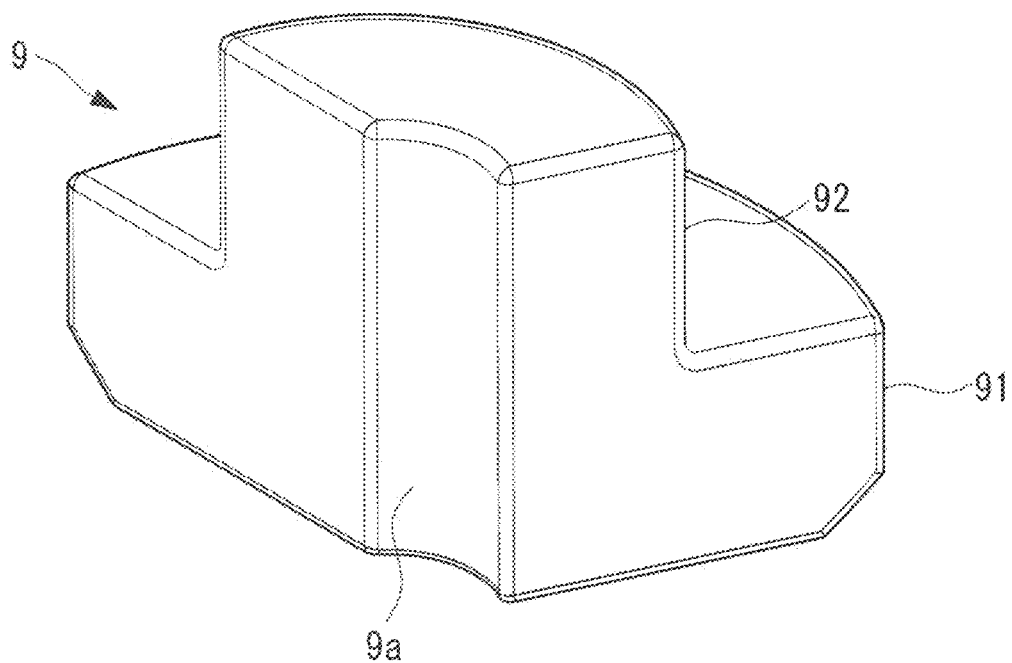
FIG. 4 is a perspective view showing an example spacer provided in the gearbox shown in FIG. 2.
Figure 5:
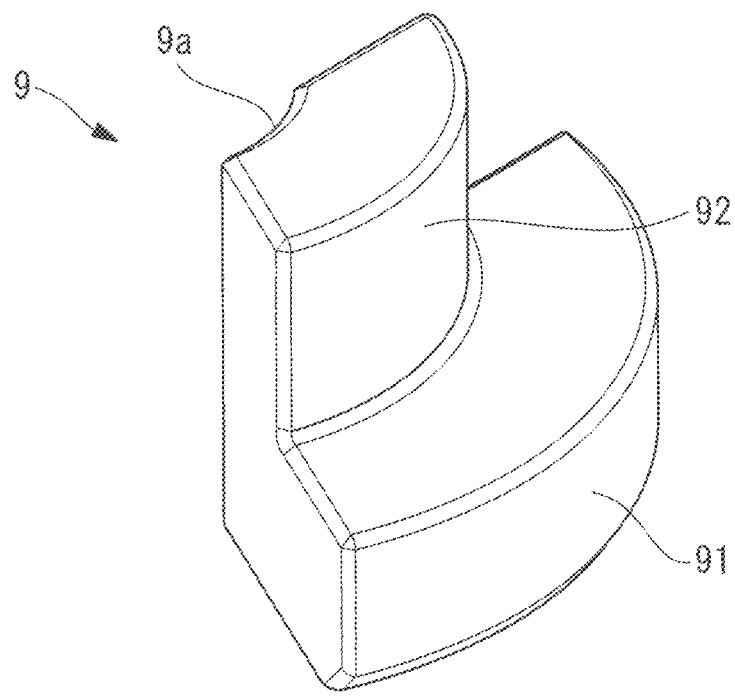
FIG. 5 is a perspective view of the spacer shown in FIG. 4 viewed from another direction.

In this embodiment, as shown in FIGS. 4 and 5, the spacer 9 has a double-decker arc shape that is substantially complementary to an interior space in which the spacer 9 is accommodated so as to fill up part of the interior space of the housing 6. A first arc-shaped section 91 that has a larger outer diameter has an outer shape to be brought into close contact with the inner surface of the housing 6, and a second arc-shaped section 92 that has a smaller outer diameter has an outer diameter so as to be disposed at a position radially inward of the internal cog 16 on the output shaft 5, with a space therebetween. The spacer 9 has a cylindrical inner surface 9a that has an inner diameter that is larger than the outer diameter of the cylinder-shaped duct member 14, which is fixed in the central hole 5a of the output shaft 5.

The spacer 9 is made of a porous material (for example, resin), such as a sponge having closed pores, has a lower density than the grease, and is elastically deformed such that the volume thereof is expanded or contracted by an external force, such as pressure, externally applied.

In this embodiment, when the spacer 9 is accommodated, in a compressed state, between the ribs 18, which protrude from the inner surface of the housing 6, and the compression force is released, the first arc-shaped section 91 is made to expand, due to the elastic restoring force, to be sandwiched between the ribs 18, thereby being fixed so as to be immobile in the housing 6. The elastic deformation applied to the spacer 9 when fixed to the housing 6 is set larger than the amount of contraction of the spacer 9 by an increased pressure. The spacer 9 is contracted by an increased internal pressure, thereby preventing the fixation of the spacer 9 from to the housing 6 from becoming loose.

The ribs 18 on the inner surface of the housing 6 are provided at positions so as to sandwich the first arc-shaped section 91 in the thickness direction and at the positions against which two circumferential end surfaces of the first arc-shaped section 91 abut in the circumferential direction.

The operations of the thus-configured gearbox 3, the weight reduction method therefor, and the robot 1 of this embodiment will be described below.

According to the gearbox 3 of this embodiment, the rotation speed of the motor 2 is reduced via the plurality of gears 71, 72, 73, and 74 and is then transferred to the output shaft 5, thus rotating the output shaft 5. Although the gears 71, 72, 73, and 74 are lubricated by the grease enclosed in the interior space of the housing 6, because the interior space of the housing 6 is partially occupied by the spacer 9, even when the amount of enclosed grease is reduced, sufficient lubrication can be performed. Because the spacer 9 is formed of a sponge having closed pores, the grease does not penetrate into the spacer 9, and a sufficient amount of grease can be held in the space occupied by the gears 71, 72, 73, and 74.

The weight reduction method for the gearbox 3 of this embodiment involves disposing the spacer 9, which has a lower density than the grease and which can be elastically deformed so as to change the volume in response to the internal pressure of the interior space, in the sealed interior space of the housing 6, which rotatably accommodates the plurality of gears 71, 72, 73, and 74 rotated by the motor 2. According to the gearbox 3 and the weight reduction method therefor of this embodiment, compared with a case in which grease is enclosed in the whole interior space, the grease is replaced with the spacer 9, thus making it possible to achieve a weight reduction by an amount corresponding to the density difference.

According to the gearbox 3 of this embodiment, because the spacer 9 is formed in an elastically deformable manner so as to change the volume due to the internal pressure of the interior space, when the rotating-shaft module 4 is driven, and the internal pressure is increased by heat generated due to the friction of the tooth surfaces of the gears 71, 72, 73, and 74, the spacer 9 is contracted. As a result, there is an advantage in that it is possible to suppress an excessive rise in the internal pressure of the interior space. Accordingly, there is an advantage in that it is possible to prevent leakage of the grease from the seal members 17 caused by an excessive rise in the internal pressure.

Figure 6:
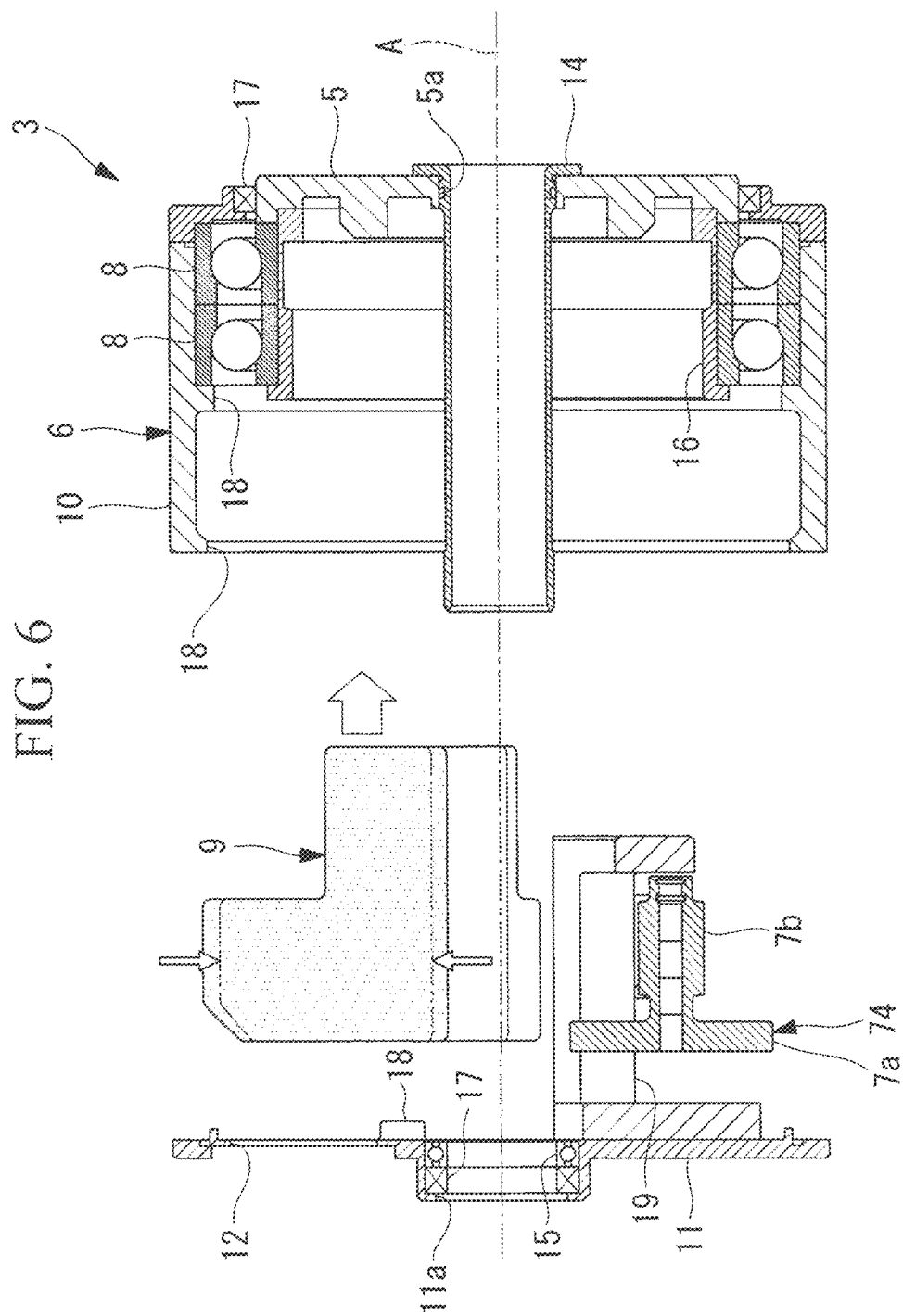
FIG. 6 is an exploded longitudinal sectional view for explaining assembly of the spacer into a housing of the gearbox shown in FIG. 1.
Figure 7:
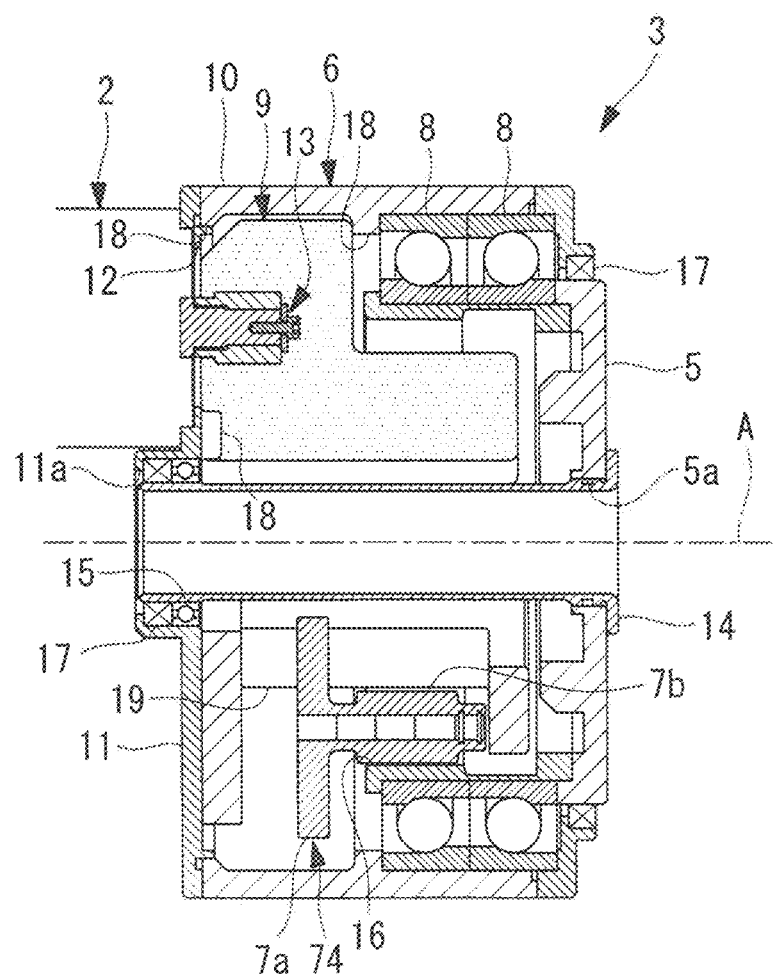
FIG. 7 is a longitudinal sectional view showing a state in which a motor is attached to the gearbox after the assembly of the spacer into the housing of the gearbox, shown in FIG. 6.

Because the spacer 9 is formed of an elastically deformable sponge (elastic material), as shown in FIGS. 6 and 7, when accommodated in the interior space (accommodation space) of the housing 6, it is guided by being contracted due to the elastic deformation so as to move beyond the rib 18, and, after disposed in the interior space, it is expanded due to the elastic restoring force, thereby being disposed at a position so as to be sandwiched between the ribs 18; thus, the spacer 9 is kept immobile in the housing 6 in any of the circumferential direction, the radial direction, and the axial direction. As a result, a fixing means, such as screws, for fixing the spacer 9 to the housing 6 is not needed, thus making it possible to simplify the housing 6 and to simplify the assembly work.

According to the gearbox 3 of this embodiment, when the speed reduction ratio is changed, a spacer 9 that has a different shape is adopted according to a change in the space occupied by the gears 71, 72, 73, and 74 caused by a reduction or an increase in the number of gears 71, 72, 73, and 74, thereby making it possible to easily comply with the change of the speed reduction ratio.

According to the robot 1 of this embodiment, it is possible to lighten respective gearboxes 3 provided in a plurality of rotating-shaft modules 4, thus lightening the entire robot 1. In particular, the spacer 9, which is formed of a sponge, can be easily and inexpensively manufactured, and, when the spacer 9 is applied to the plurality of rotating-shaft modules 4, it is possible to achieve a significant cost reduction.

There is an advantage in that it is possible to prevent leakage of the grease and breakage of the seal members 17 in the gearboxes 3 in the respective rotating-shaft modules 4, thus making it possible to eliminate frequent maintenance of the robot 1.

In this embodiment, although the spacer 9 is formed of a porous material, such as a sponge having closed pores, instead of this, it is also possible to form the spacer 9 by adopting a sponge having continuous pores and applying processing, such as coating, for occluding the pores on the surface. Accordingly, there is an advantage in that it is possible to achieve a reduction in weight, a reduction in the amount of enclosed grease, and an effect of suppressing an excessive rise in the internal pressure and to facilitate movement of air in the continuous pores, thus facilitating elastic deformation.

In this embodiment, although the spacer 9 is formed of a sponge, instead of this, the spacer 9 may be formed of a bag (elastic material) that has an air chamber therein, that is elastically deformable due to the internal pressure of the interior space, and that has a shape similar to that shown in FIGS. 4 and 5.

Instead of making the entire spacer 9 elastically deformable, the spacer 9 may be partially provided with a region that is elastically deformable due to the internal pressure.

As the spacer 9, it is possible to adopt a spacer 9, such as a so-called active damper, that has an air chamber in the spacer 9 and that is provided with a device for constantly monitoring and controlling the air pressure in the air chamber, wherein the internal pressure of the spacer 9 is actively controlled so as to prevent an excessive rise in gearbox internal pressure.

As a result, the following aspect is read by the above described embodiment of the present invention.

According to one aspect, the present invention provides a gearbox including: a plurality of gears that are rotated by a motor; a housing that has a sealed interior space for rotatably accommodating the respective gears; and a spacer that is disposed in the interior space of the housing and that partially occupies the interior space, wherein the spacer has a lower density than grease and is elastically deformable so as to change the volume thereof according to an internal pressure of the interior space.

According to this aspect, the spacer is disposed in the interior space of the housing, which rotatably supports the plurality of gears, thereby making it possible to prevent the grease, which lubricates the gears, from entering the interior space occupied by the spacer. Specifically, because the interior space is partially occupied by the spacer, it is possible to significantly reduce the amount of grease that can sufficiently lubricate the gears. Because the interior space is partially occupied by the spacer, which has a lower density than the grease, even when the amount of grease that can sufficiently lubricate the gears is enclosed in the interior space, it is possible to achieve a reduction in weight by an amount corresponding to the density difference between the grease and the spacer.

In this case, the spacer that is elastically deformable so as to change the volume thereof according to the internal pressure of the interior space is adopted, so that, when the internal pressure of the interior space is increased, the spacer is contracted, thus making it possible to suppress an excessive rise in the pressure of the interior space. Specifically, even when the friction between the tooth surfaces occurs due to the rotations of the gears, and the gearbox generates heat, thereby increasing the internal pressure of the interior space, because contraction of the spacer suppresses an excessive rise in pressure, it is possible to prevent leakage of the grease from seal members that seal the gearbox and breakage of the seal members.

In the above-described aspect, the spacer may be formed of a porous elastic material in which individual pores are closed.

By doing so, the grease can be prevented from entering the spacer via the pores, thus making it possible to effectively use the grease for lubrication of the gears. When the internal pressure of the interior space is increased, the volumes of the pores are contracted to contract the spacer, thereby making it possible to suppress an excessive rise in pressure.

In the above-described aspect, the spacer may be obtained by applying processing for occluding pores to the surface of a porous elastic material.

By doing so, through the processing applied to the surface, the grease can be prevented from entering the spacer via the pores, thus making it possible to effectively use the grease for lubrication of the gears. A porous material having either continuous pores or closed pores can be used as the spacer material, and, when a porous material having continuous pores is used, the flexibility of the spacer can be improved.

In the above-described aspect, the processing for occluding the pores may be coating for coating the surface.

By doing so, the pores on the surface of the spacer can be easily occluded through coating.

In the above-described aspect, the spacer may be a sealed bag formed of an elastic material.

By doing so, the inside of the bag is only air, thus making it possible to more effectively achieve a reduction in weight, and, when the internal pressure of the interior space is increased, the volume of the inside of the bag is contracted, thus making it possible to suppress an excessive rise in pressure.

In the above-described aspect, the housing may have an accommodation space for accommodating the spacer in a compressed state, and the spacer may be kept immobile in the accommodation space due to an elastic restoring force thereof.

By doing so, in a state in which the spacer is elastically deformed by an external force applied so as to contract the spacer, the spacer is disposed in the accommodation space of the housing, and the external force is released, thus making the spacer expand due to the elastic restoring force thereof; thus, it is possible to fix the spacer in the housing without using a special fixing means, such as a screw. In this case, the spacer is fixed in the housing in a state in which the spacer is made to contract excessively in consideration of contraction to be caused by a rise in the internal pressure, thereby making it possible to keep the spacer immobile in the housing while suppressing an excessive rise in the internal pressure.

According to another aspect, the present invention provides a gearbox weight reduction method including disposing, in a sealed interior space of a housing for rotatably accommodating a plurality of gears rotated by a motor, a spacer that has a lower density than grease and that is elastically deformable so as to change the volume thereof according to an internal pressure of the interior space.

According to still another aspect, the present invention provides a robot including: the motor; and a gearbox according to one of claims 1 to 6, that reduces the rotation speed of the motor.

REFERENCE SIGNS LIST 1 robot
2 motor
3 gearbox
6 housing
9 spacer (bag)
13 pinion gear (gear)
71 first gear (gear)
72 second gear (gear)
73 third gear (gear)
74 fourth gear (gear)

The invention claimed is:

1. A gearbox comprising:
   a plurality of gears rotated by a motor;
   a housing that rotatably accommodates the respective gears, that is sealed by a seal member, and that has an interior space in which grease for lubricating the gears is filled;
   a spacer that is disposed in the interior space of the housing isolated from an exterior space by the housing and that partially occupies the interior space;
   wherein the spacer has a lower density than grease and is elastically deformable so as to change the volume thereof according to only an internal pressure of the interior space; and
   wherein the housing has an accommodation space for accommodating the spacer in a compressed state and the spacer is kept immobile in the accommodation space due to an elastic restoring force thereof.

2. The gearbox according to claim 1, wherein the spacer is formed of a porous elastic material in which individual pores are closed.

3. The gearbox according to claim 1, wherein the spacer is obtained by applying processing for occluding pores to the surface of a porous elastic material.

4. The gearbox according to claim 3, wherein the processing for occluding the pores comprises coating the surface.

5. The gearbox according to claim 1, wherein the spacer is a sealed bag formed of an elastic material.

6. A robot comprising:
   a gearbox according to claim 1; and
   wherein the gearbox reduces a rotation speed of the motor.

7. A gearbox weight reduction method comprising:
   disposing, in an interior space of a housing sealed by a seal member of the housing for rotatably accommodating a plurality of gears rotated by a motor, the interior space is filled with grease for lubricating the gears, a spacer that has a lower density than grease and that is elastically deformable so as to change the volume thereof according to only an internal pressure of the interior space in a state in which the spacer is isolated from an exterior space by the housing; and
   wherein the housing has an accommodation space for accommodating the spacer in a compressed state and the spacer is kept immobile in the accommodation space due to an elastic restoring force thereof.

* * * * *